US010394505B2

(12) United States Patent
Tabuki

(10) Patent No.: US 10,394,505 B2
(45) Date of Patent: Aug. 27, 2019

(54) IMAGE FORMING APPARATUS THAT CONTROLS AN EXECUTION ORDER OF JOBS, CONTROL METHOD THEREOF, STORAGE MEDIUM, AND IMAGE FORMING SYSTEM

(71) Applicant: CANON KABUSHIKI KAISHA, Tokyo (JP)

(72) Inventor: Masumi Tabuki, Toride (JP)

(73) Assignee: CANON KABUSHIKI KAISHA, Tokyo (JP)

(\*) Notice: Subject to any disclaimer, the term of this patent is extended or adjusted under 35 U.S.C. 154(b) by 143 days.

(21) Appl. No.: 15/627,789

(22) Filed: Jun. 20, 2017

(65) Prior Publication Data
US 2018/0004465 A1    Jan. 4, 2018

(30) Foreign Application Priority Data
Jun. 30, 2016   (JP) ................... 2016-131038

(51) Int. Cl.
| G06F 15/00 | (2006.01) |
| G06F 3/12  | (2006.01) |
| G06K 1/00  | (2006.01) |

(52) U.S. Cl.
CPC ............ G06F 3/1263 (2013.01); G06F 3/121 (2013.01); G06F 3/1207 (2013.01); G06F 3/1217 (2013.01); G06F 3/1234 (2013.01); G06F 3/1259 (2013.01); G06F 3/1287 (2013.01); G06F 3/1288 (2013.01)

(58) Field of Classification Search
CPC ...... G06F 3/1263; G06F 3/1207; G06F 3/121; G06F 3/1217; G06F 3/1234; G06F 3/1259; G06F 3/1287; G06F 3/1288
USPC ............................. 358/1.15, 1.1, 1.13, 1.14
See application file for complete search history.

(56) References Cited

U.S. PATENT DOCUMENTS

| 8,659,777 | B2 | 2/2014 | Yokokura | |
| 2012/0163837 | A1* | 6/2012 | Tomita | G03G 21/105 399/13 |
| 2014/0340702 | A1* | 11/2014 | Maki | G06F 3/1285 358/1.14 |

FOREIGN PATENT DOCUMENTS

JP    5654806 B2    1/2015

\* cited by examiner

*Primary Examiner* — Douglas Q Tran
(74) *Attorney, Agent, or Firm* — Rossi, Kimms & McDowell LLP

(57) ABSTRACT

An image forming apparatus obtains first print data from an external apparatus, stores, in a storage, identification information representing that image formation based on the first print data is uncompleted, obtains second print data from the external apparatus in a status in which the identification information is not stored in the storage, and inhibits obtaining of the second print data from the external apparatus in a status in which the identification information is stored in the storage.

12 Claims, 13 Drawing Sheets

F I G. 9

◆ EXAMPLE OF JOB GENERATION NOTIFICATION AND PRINT-IN-PROGRESS INFORMATION

```
"print Job": {
    "job_id": "0001",
    "job_type": "application/pdf",
    "job_size": 33888,
    "job_name": "Print Doc.pdf"
    "fileUrl": "http://www.cloudprint.com/download?id\1303E14A-6A49-4944-9AAB-1A1BBC2B9D7E"
}
```

F I G. 10

◆ EXAMPLE OF JOB LIST

```
"print JobList": {
    "job_id": "001",
    "job_status": "Queued",
    "job_type": "application/pdf",
    "job_size": 33888,
    "job_name": "JOB 1.pdf"
    "fileUrl": "http://www.cloudprint.com/download?id\1303E14A-6A49-4944-9AAB-1A1BBC2B9D7E"

"job_id": "0002",
    "job_status": "Queued",
    "job_type": "application/pdf",
    "job_size": 11111,
    "job_name": "JOB 2.pdf"
    "fileUrl": "http://www.cloudprint.com/download?id\1303E14A-6A49-4944-9AAB-1A1BBC2B9D7E"
}
```

IMAGE FORMING APPARATUS THAT CONTROLS AN EXECUTION ORDER OF JOBS, CONTROL METHOD THEREOF, STORAGE MEDIUM, AND IMAGE FORMING SYSTEM

BACKGROUND OF THE INVENTION

Field of the Invention

The present invention relates to an image forming apparatus supporting a cloud print service, a control method thereof, a storage medium, and an image forming system.

Description of the Related Art

In recent years, many office machines such as a copying machine and a printer support a cloud print service. The cloud print service is a technology that allows a user to upload image data in a portable terminal such as a smartphone to a cloud server and instruct an image forming apparatus in a remote site to print the data. The cloud print service also enables the user to instruct the image forming apparatus in the remote site to print data held on the cloud server.

In print of this service, image data can be transmitted directly from a desktop or mobile application to any printer (irrespective of the maker that has manufactured the printer) via a known general-purpose image format without the need to use a printer driver. The image format includes, for example, standard data formats such as PDF (Portable Document Format) that is the international standard of ISO 32000-1. The image format also includes the PWG (Printer Working Group)-Raster format standardized by PWG that is one of the standardization working groups of IEEE.

A job on the cloud server is held in a status such as Queued (=job received)/InProgress (=print processing in progress)/Done(=printed) and managed. If a job in the InProgress (=print processing in progress) status exists on the cloud server, the image forming apparatus is required to actively obtain and print the job and change it to the Done (=printed) status. As an example of guaranteeing the print order of a job, Japanese Patent No. 5654806 proposes processing of embedding a job ticket including the print attribute of a job or the like in the print order and causing an image forming apparatus to interpret the contents of the job ticket and print it in accordance with the predetermined order.

However, the conventional technique has problems to be described below. For example, if the network between the image forming apparatus and the cloud server is disconnected by power-off of the image forming apparatus or disconnection of a network cable halfway through print, a job remaining in the "processing in progress (=InProgress)" status is held on the cloud server. The image forming apparatus needs to automatically reprint the job in the "processing in progress (=InProgress)" status. However, if the image forming apparatus receives another new job before the print of the job in the "processing in progress" status, and some error occurs halfway through print of the received new job, a plurality of jobs in the "processing in progress (=InProgress)" status may exist on the cloud server. In this case, the image forming apparatus cannot determine which job should be printed first. In addition, if a job is divided into a plurality of jobs, and the print order of the divided jobs is linked using another information different from the job, such as a job ticket, a restriction to, for example, inhibit partial deletion of the divided jobs occurs, and flexible system operation is impossible.

SUMMARY OF THE INVENTION

The present invention enables realization of a mechanism for, even if an image forming apparatus stops executing a job during execution of the job in a cloud print service, suitably controlling the execution order of the job and another job upon resumption.

According to one aspect of the present invention, there is provided an image forming apparatus capable of communicating with an external apparatus, comprising: a storage configured to store information; an image forming unit configured to form an image on a sheet; and one or more controllers having a processor executing instructions stored in a memory or having circuitry, configured to perform: processing of obtaining first print data from the external apparatus and storing, in the storage, identification information representing that image formation based on the first print data is uncompleted; and processing of obtaining second print data from the external apparatus in a status in which the identification information is not stored in the storage, and inhibiting obtaining of the second print data from the external apparatus in a status in which the identification information is stored in the storage.

According to another aspect of the present invention, there is provided a control method of an image forming apparatus capable of communicating with an external apparatus, the image forming apparatus comprising: a storage configured to store information; an image forming unit configured to form an image on a sheet; and one or more controllers having a processor executing the control method comprising: obtaining first print data from the external apparatus and storing, in the storage, identification information representing that image formation based on the first print data is uncompleted; obtaining second print data from the external apparatus in a status in which the identification information is not stored in the storage; and inhibiting obtaining of the second print data from the external apparatus in a status in which the identification information is stored in the storage.

According to still another aspect of the present invention, there is provided a non-transitory computer-readable storage medium storing a control program configured to cause a computer to execute a control method of an image forming apparatus capable of communicating with an external apparatus, the image forming apparatus comprising: a storage configured to store information; an image forming unit configured to form an image on a sheet; and one or more controllers having a processor executing the control method comprising: obtaining first print data from the external apparatus and storing, in the storage, identification information representing that image formation based on the first print data is uncompleted; obtaining second print data from the external apparatus in a status in which the identification information is not stored in the storage; and inhibiting obtaining of the second print data from the external apparatus in a status in which the identification information is stored in the storage.

According to yet another aspect of the present invention, there is provided an image forming system comprising a server configured to manage print data, and an image forming apparatus configured to perform image formation based on print data, wherein the server is configured to perform: processing of notifying the image forming apparatus that transmissible print data exists; and processing of transmitting requested print data in accordance with a request from the image forming apparatus, and the image forming apparatus is configured to perform: processing of obtaining first print data from an external apparatus and storing identification information representing that image formation is uncompleted; and processing of receiving the notification and requesting transmission of second print data in a status in which the identification information is not stored, and receiving the notification and inhibiting request of transmission of the second print data from the server in a status in which the identification information is stored.

Further features of the present invention will be apparent from the following description of exemplary embodiments with reference to the attached drawings.

BRIEF DESCRIPTION OF THE DRAWINGS

FIG. 9 is a view showing an example of a job notification in step S1003 and print-in-progress information in steps S3006 and S3023 of FIGS. 8A and 8C according to the embodiment;

FIG. 10 is a view showing an example of job list return in step S1005 according to the embodiment;

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<System Arrangement>

Figure 1:
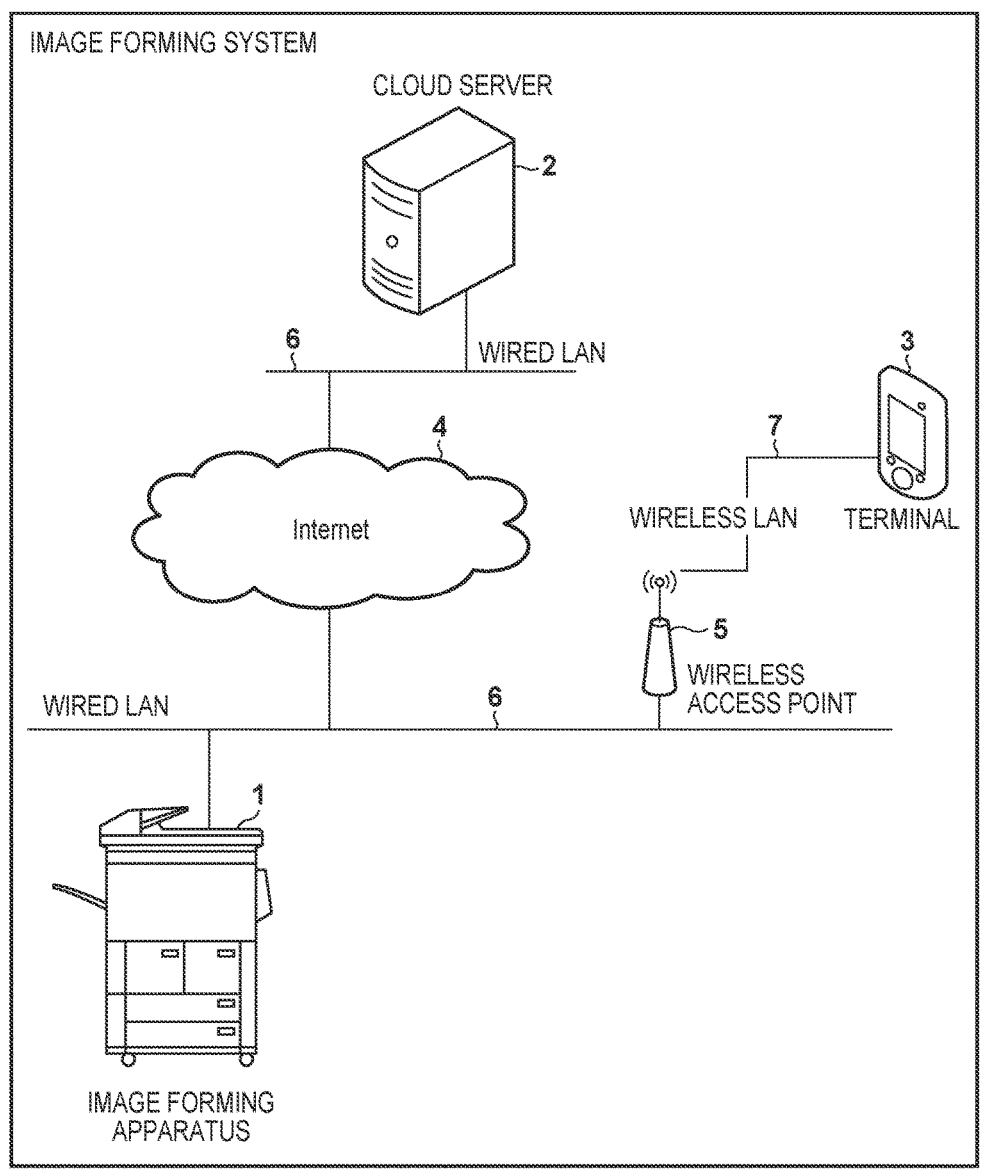
FIG. 1 is a view showing an example of the overall arrangement of an image forming system according to an embodiment.

An embodiment of the present invention will be described below. An example of the arrangement of an image forming system that provides a cloud print service according to the embodiment will be described first with reference to FIG. 1. The image forming system includes a cloud server 2, a mobile terminal 3 (to be referred to as a terminal 3 hereinafter), and an image forming apparatus 1.

The terminal 3 is communicably connected to a wireless access point 5 via a wireless LAN 7. The remaining devices are communicably connected to the Internet 4 via a wired LAN 6. Note that in this embodiment, the cloud server 2 includes one server. However, the cloud server 2 may include a plurality of servers, and a cloud print service shown in FIG. 3 (to be described later) may be implemented by the plurality of servers. The devices included in the image forming system can communicably be connected via the Internet 4 and can communicate data to each other. In addition, the terminal 3 and the image forming apparatus 1 can communicably be connected without the intervention of the Internet 4. Each of the terminal 3 and the image forming apparatus 1 may include a plurality of devices arranged.

<Hardware Arrangement of Image Forming Apparatus>

Figure 2:
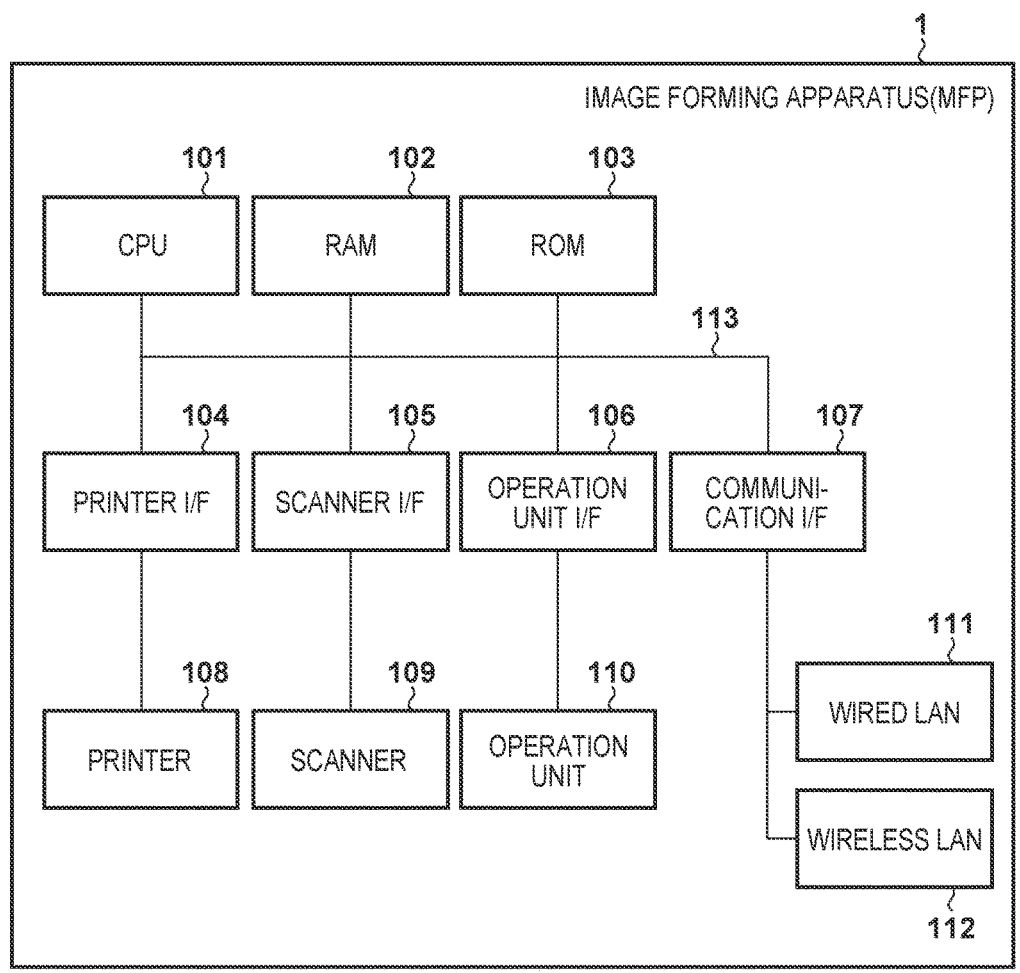
FIG. 2 is a block diagram showing the hardware arrangement of an image forming apparatus 1 according to the embodiment.

An example of the hardware arrangement of the image forming apparatus 1 according to this embodiment will be described next with reference to FIG. 2. The image forming apparatus 1 includes a CPU 101, a RAM 102, a ROM 103, a printer I/F 104, a scanner I/F 105, an operation unit I/F 106, and a communication I/F 107. The image forming apparatus 1 also includes a printer 108, a scanner 109, an operation unit 110, and NICs such as a wired LAN 111 and a wireless LAN 112. Note that the CPU is short for Central Processing Unit. The RAM is short for Random Access Memory. The ROM is short for Read Only Memory. The NIC is short for Network Interface Controller.

The CPU 101 controls the operation of the entire image forming apparatus 1. The CPU 101 loads a program stored in the ROM 103 to the RAM 102 and executes it as needed, thereby generally controlling the devices connected to a system bus 113. The RAM 102 functions as the main memory and the work area of the CPU 101 and is also used as the area to accumulate image information. The ROM 103 stores various fonts, control programs to be executed by the CPU 101, and various kinds of data. The ROM 103 also includes an NVRAM (Non-volatile RAM) area and is configured to easily perform reprint even if sudden power-off occurs halfway through execution of print by the cloud print service.

The printer I/F 104 controls the interface to the printer 108 that is a printer engine. The scanner I/F 105 controls the interface to the scanner 109 that is a scanner engine. The operation unit I/F 106 controls the interface to the operation unit 110 to do various settings for the image forming apparatus 1. Note that the image forming apparatus includes a keyboard serving as an input device and a display serving as a display device, although not illustrated in detail in FIG. 2.

The communication I/F 107 controls communication of the NICs such as the wired LAN 111 and the wireless LAN 112. The wired LAN 111 and the wireless LAN 112 are connection I/Fs to the wired LAN 6 and the wireless LAN 7 and control data transmission/reception to/from the cloud server 2 or the terminal 3. The communication I/F 107 includes an implementation such as a web service protocol suitable for the execution environment.

The CPU 101 loads a program stored in the ROM 103 to the RAM 102 and executes it as needed. However, a program recorded in the cloud server 2 may be loaded to the RAM 102 and executed by the CPU 101.

<Hardware Arrangement of Cloud Server and Terminal>

Figure 3:
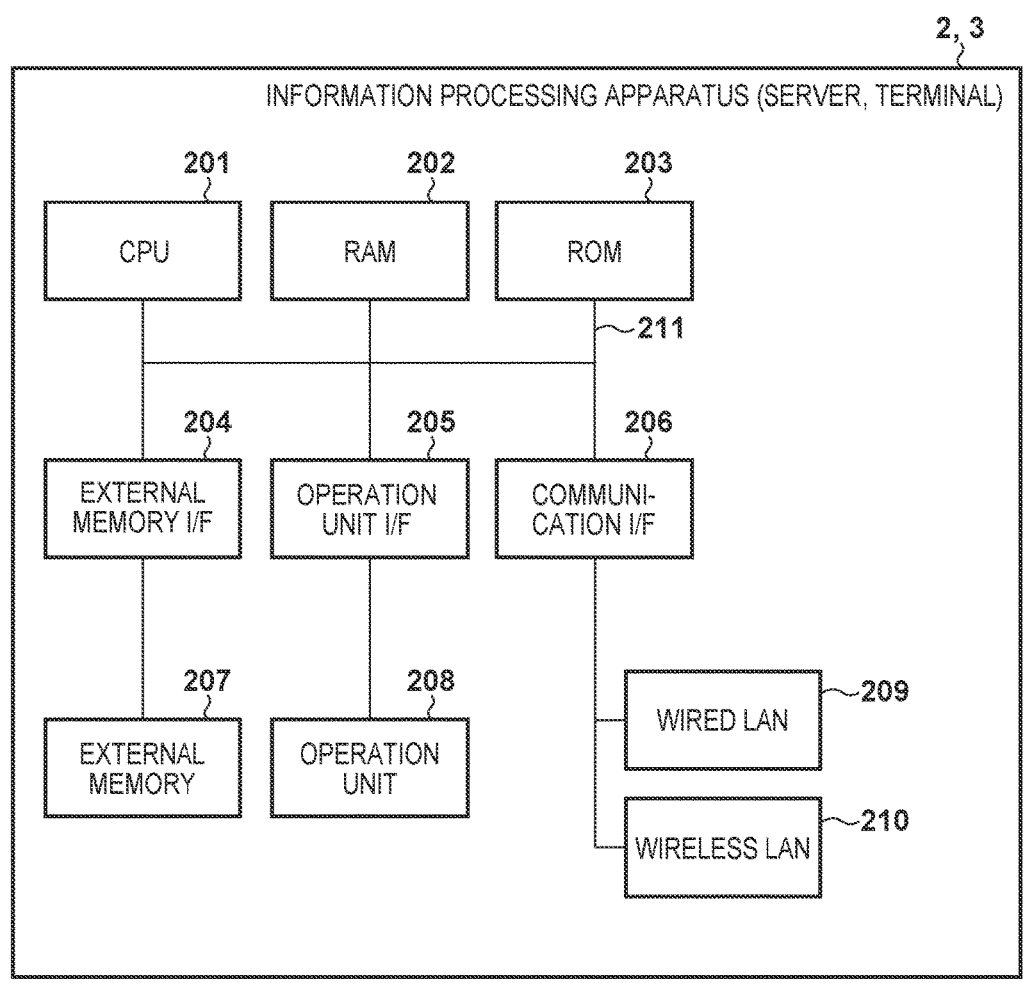
FIG. 3 is a block diagram showing the hardware arrangement of a cloud server 2 and a terminal 3 according to the embodiment.

An example of the hardware arrangement of the cloud server 2 and the terminal 3 according to this embodiment will be described next with reference to FIG. 3. Each of the cloud server 2 and the terminal 3 includes a CPU 201, a RAM 202, a ROM 203, an external memory I/F 204, an operation unit I/F 205, and a communication I/F 206.

The CPU 201 loads a program stored in the ROM 203 serving as a storage unit to the RAM 202 and executes it as needed, thereby generally controlling devices connected to a system bus 211. The RAM 202 functions as the main memory and the work area of the CPU 201. The ROM 203 stores various programs and data.

The external memory I/F 204 controls access to an external memory 207 such as a flash memory or an SSD (Solid State Disk). The external memory 207 functions as a storable or readable storage medium and stores an operating system (OS), web browser, and applications. The applications and the programs of modules (software) are stored in the external memory 207, loaded to the RAM 202 as needed, and executed by the CPU 201. The functions of the applications and modules (software) are thus implemented.

The operation unit I/F 205 controls input from an operation unit 208. Note that the device includes a keyboard serving as an input device and a display serving as a display device, although not illustrated in detail in FIG. 3. The communication I/F 206 controls communication of NICs such as a wired LAN 209 and a wireless LAN 210. The wired LAN 209 is a connection I/F to the wireless LAN, and the wireless LAN 210 is a connection I/F to the wired LAN 6, and they control data transmission/reception to/from the cloud server 2 or the terminal 3. The communication I/F 206 includes an implementation such as a web service protocol suitable for the execution environment.

Processing to be explained in this embodiment also has a configuration capable of loading a program stored in the external memory 207 to the RAM 202 and executing it by the CPU 201.

<Software Configuration of Image Forming Apparatus>

Figure 4:
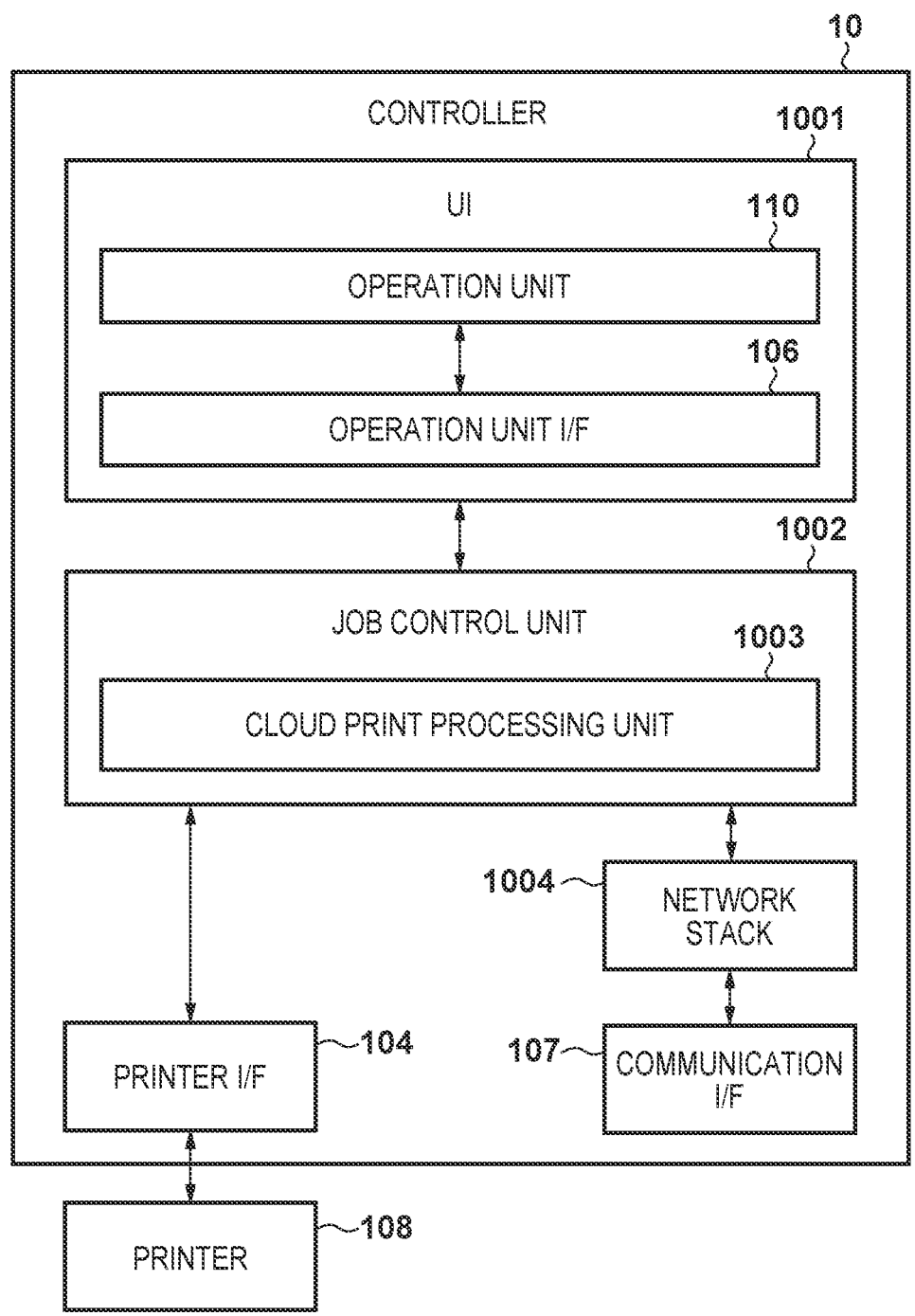
FIG. 4 is a block diagram showing the software configuration of the image forming apparatus 1 according to the embodiment.

The software configuration of a controller 10 of the image forming apparatus 1 will be described next with reference to FIG. 4. As the software configuration, the image forming apparatus 1 includes the modules of a user interface (UI) 1001, a job control unit 1002, and a network stack 1004. The job control unit 1002 includes the task of a cloud print processing unit 1003. Each module or task is constituted by a program stored in the ROM 103 shown in FIG. 2, and implemented by processing the program by the CPU 101. Although not illustrated in FIG. 4, the CPU 101 manages the operation of the entire controller 10.

The UI 1001 inputs/outputs various kinds of information necessary for control of the controller 10 via the operation unit 110 controlled by the operation unit I/F 106. The network stack 1004 controls network protocols including XMPP and HTTP as well as TCP/IP and implements communication with the cloud server 2 or the terminal 3 via the communication I/F 107.

The printer I/F 104 and the printer 108 have been described with reference to FIG. 2, and a description thereof will be omitted here. Note that the cloud print processing unit 1003 controls processing of the flowcharts of FIGS. 8A-8C (to be described later). The cloud print processing unit 1003 also executes the sequence of cloud print (to be described later) using job information received via the communication I/F 107 and causes the printer 108 to perform print via the printer I/F 104.

<Software Configuration of Cloud Server>

Figure 5:
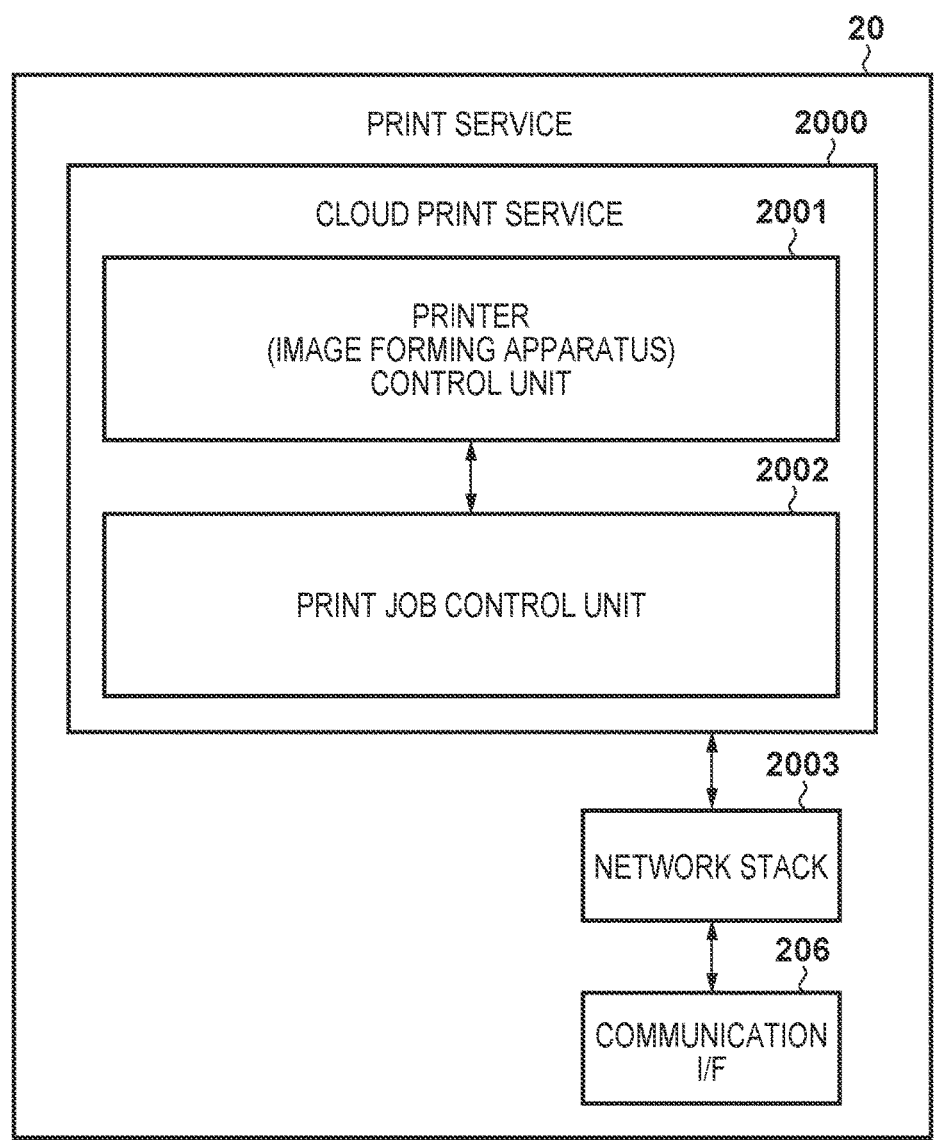
FIG. 5 is a block diagram showing the software configuration of the cloud server 2 according to the embodiment.

The software configuration of a print service 20 of the cloud server 2 according to this embodiment will be described next with reference to FIG. 5. Note that the software configuration to be described below is a configuration implemented by the cloud server 2 in this embodiment. However, the present invention is not limited to this, and some functions may be provided in the terminal 3.

Figure 7:
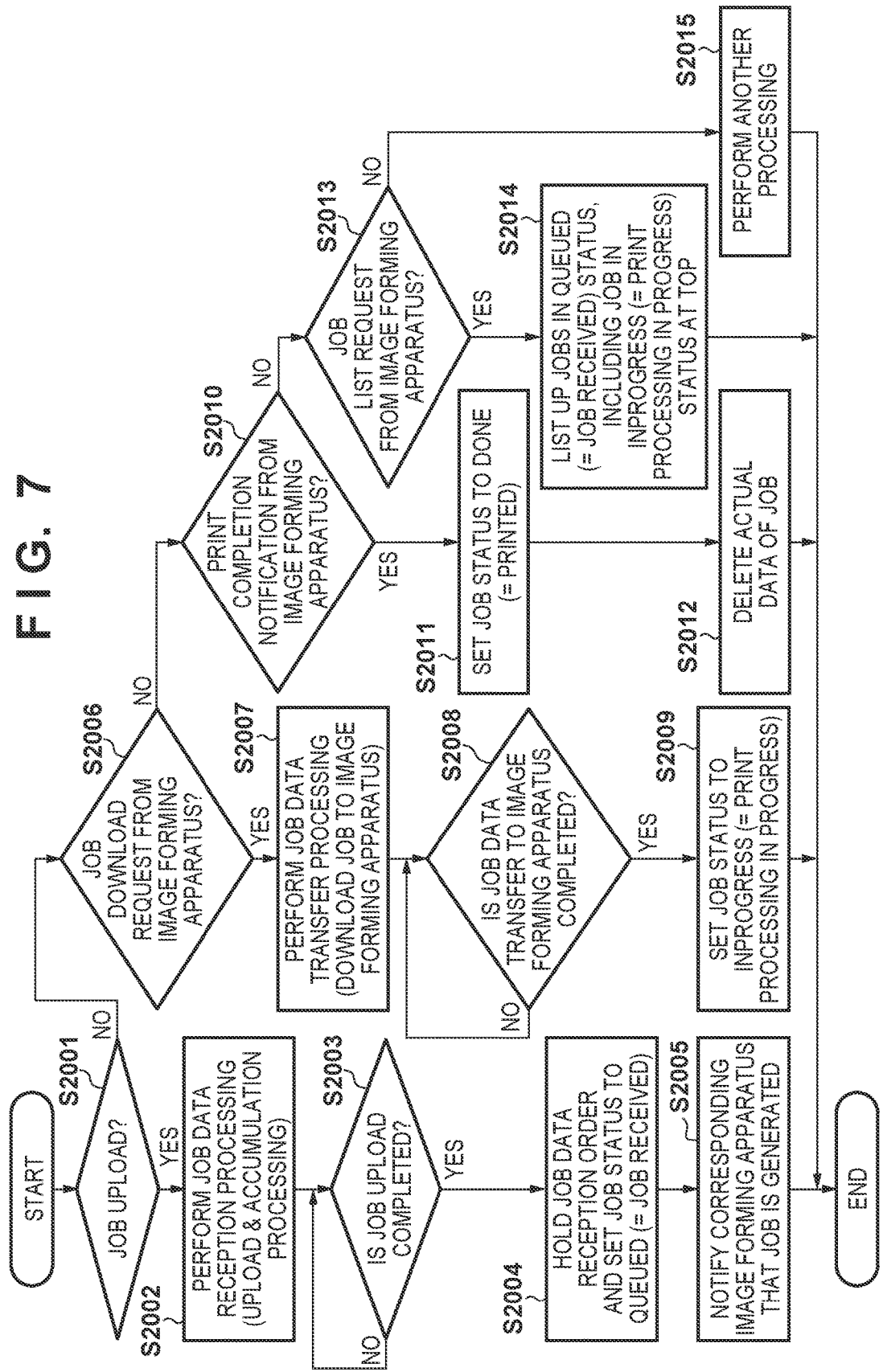
FIG. 7 is a flowchart showing the processing procedure of the image forming system according to the embodiment.

The print service 20 includes the modules of a cloud print service 2000 and a network stack 2003, and controls processing of the flowchart of FIG. 7 (to be described later). The cloud print service 2000 includes a printer (image forming apparatus) control unit 2001, and a print job control unit 2002. Each module or task is constituted by a program stored in the ROM 203 of the cloud server 2, and implemented by processing the program by the CPU 201.

The printer (image forming apparatus) control unit 2001 manages the capability and IP address of the printer that is the image forming apparatus. The printer (image forming apparatus) control unit 2001 also sends a notification of job generation to the image forming apparatus linked with an uploaded print job (image forming job), and manages a job list of each image forming apparatus. The print job control unit 2002 is a portion that uploads (cumulatively stores) job information or downloads job information to the image forming apparatus, and manages the status of a job. The network stack 2003 controls network protocols including XMPP and HTTP as well as TCP/IP and implements communication with the image forming apparatus 1 via the Internet 4.

<Sequence>

Figure 6:
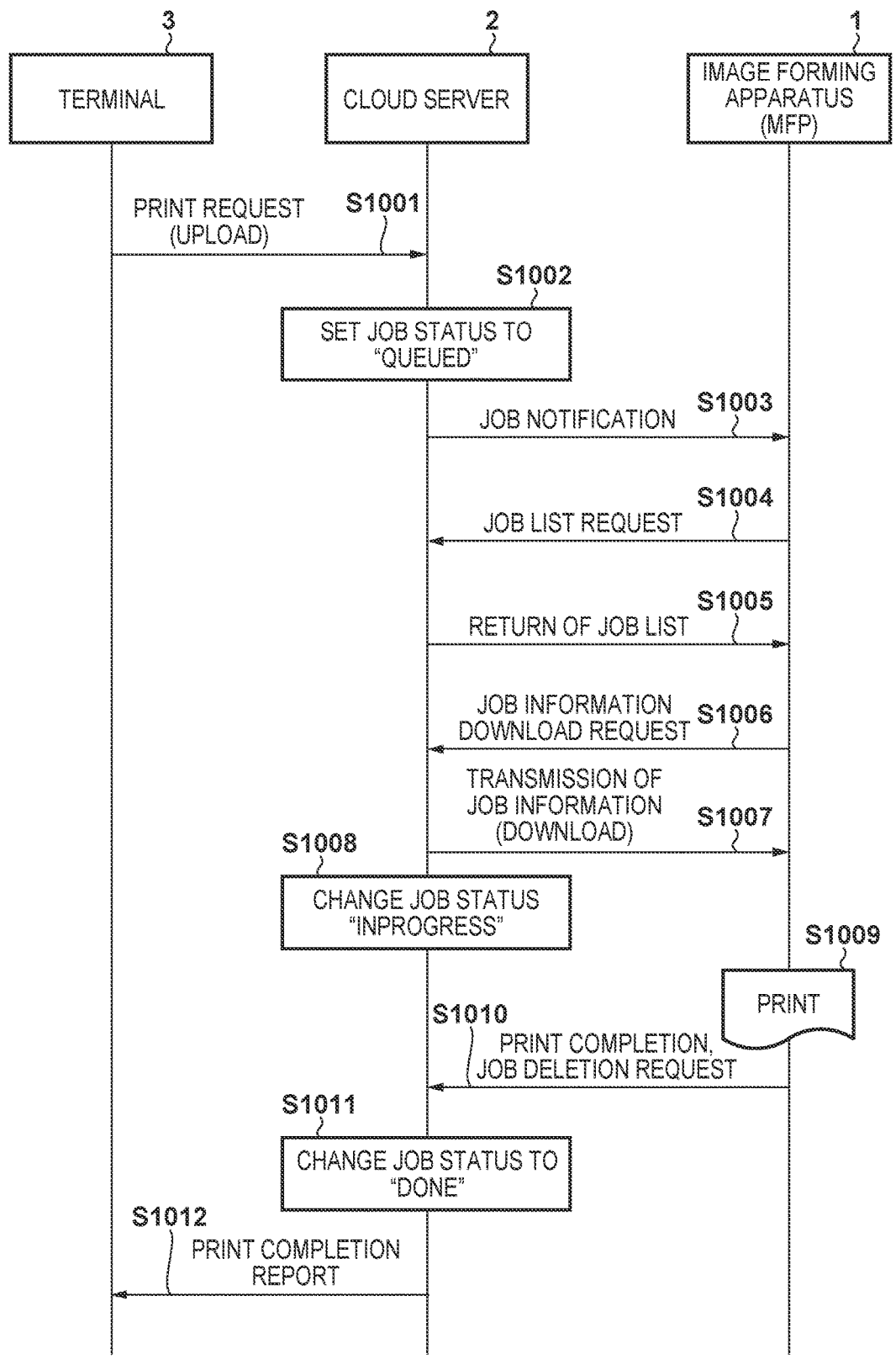
FIG. 6 is a sequence chart showing an example of the sequence of general cloud print.

An example of the sequence of cloud print according to this embodiment will be described next with reference to FIG. 6. Particularly, in this embodiment, the sequence of cloud print will be explained based on Google Cloud Print made open to the public by Google®.

First, in step S1001, the terminal 3 sends a print job that links image information to be printed with an image forming apparatus to print it to the cloud server 2 to do print request (upload). After that, in step S1002, the cloud server 2 waits for completion of upload and sets the job status to Queued (=job received). Here, the setting may be implemented by, for example, setting a corresponding value to a flag representing corresponding job status information. Next, in step S1003, the cloud server 2 notifies the job to the image forming apparatus 1 that is the print destination of the job information uploaded in step S1001.

In step S1004, the image forming apparatus 1 that has received the job notification requests, from the cloud server 2, the list of jobs linked with the image forming apparatus 1. In step S1005, the cloud server 2 returns, to the image forming apparatus 1, the list of jobs to be printed by the image forming apparatus 1 that has requested the job list.

In step S1006, the image forming apparatus 1 confirms the presence/absence of the job notified in step S1003 in the job list obtained in step S1005, and requests the cloud server 2 to download the information of the job. In step S1007, the cloud server 2 downloads the job notification to the image forming apparatus 1. When the download of the job notification to the image forming apparatus 1 is completed, in step S1008, the cloud server 2 changes the status of the downloaded job to InProgress (=print processing in progress). This status represents that the job is being printed, that is, that the started image formation of the job is not completed.

In step S1009, the image forming apparatus 1 executes print using the job notification downloaded in step S1007. When the print is completed, in step S1010, the image forming apparatus 1 sends a print completion notification and a job information deletion request to the cloud server 2. After that, in step S1011, the cloud server 2 changes the status of the job of the completion notification from the image forming apparatus 1 to Done (=printed), and deletes the print data. This status represents that the started image formation of the job is completed.

In step S1012, the cloud server 2 notifies the terminal 3 that the print of the job uploaded in step S1001 is completed by the designated image forming apparatus, and ends the sequence. This sequence is merely an example, and the job status may be changed in accordance with an instruction from the image forming apparatus. Linking of the job and the image forming apparatus is processing performed on the terminal side. However, it may be done on the server side. Additionally, in the example shown in FIG. 6, an arrangement including the image forming apparatus 1, the cloud server 2, and the terminal 3 has been described. However, since the terminal 3 can easily be expected to attain an improved capability, at least some functions of the cloud server 2 may be provided in the terminal 3.

<Processing Procedure>

The processing procedure of the cloud print service 2000 of the cloud server 2 according to this embodiment will be described next with reference to FIG. 7. The processing to be described below is processing implemented by executing a program that constitutes the cloud print service 2000 by the CPU 201.

First, in step S2001, the CPU 201 receives a request from an external apparatus, and determines whether the request is a print request (job upload) from the terminal 3 to the cloud server 2. If the request is a print request, the process advances to step S2002. Otherwise, the process advances to step S2006.

In step S2002, the CPU 201 receives print data from the terminal 3 and stores the received information in a memory or the like. Next, the process advances to step S2003, and the CPU 201 determines whether the job upload is completed. Upon determining that the job upload is completed, the process advances to step S2004. Otherwise, the determination of step S2003 is periodically repeated.

In step S2004, the CPU 201 holds the information of the job reception order and sets the status of the job upload-requested by the terminal 3 to Queued (=job received). Here, for example, a value representing that the job is received is set to a flag representing the status information of the job. Note that job status change processing to be described below may similarly be processing of setting a corresponding value to a flag. After that, in step S2005, the CPU 201 notifies the image forming apparatus 1, to which the print instruction from the terminal 3 is sent, that the job is generated, and completes the processing.

On the other hand, if the request from the external apparatus is not job upload in step S2001, the process advances to step S2006, and the CPU 201 determines whether the request is a job download request from the image forming apparatus 1. If the request is a job download request, the process advances to step S2007. Otherwise, the process advances to step S2010.

In step S2007, the CPU 201 downloads (transfers) the print data uploaded from the terminal 3 in step S2002 to the image forming apparatus 1. In this embodiment, the print data uploaded in step S2002 is downloaded in step S2007 without image conversion. However, the cloud server 2 may convert the print data into an image format processable by the image forming apparatus 1 and downloads the conversion result to the image forming apparatus 1.

Next, in step S2008, the CPU 201 determines whether the job download is completed. If the job download is completed, the process advances to step S2009. Otherwise, the determination of step S2008 is periodically repeated. In step S2009, the CPU 201 changes the job status to InProgress (=print processing in progress), and completes the processing.

Upon determining in step S2006 that the request is not a download request from the image forming apparatus 1, the process advances to step S2010, and the CPU 201 determines whether a print completion notification from the image forming apparatus 1 is received. If a print completion notification is received, the process advances to step S2011. Otherwise, the process advances to step S2013. In step S2011, the CPU 201 changes the job status to Done (=printed). Next, in step S2012, the CPU 201 performs delete processing of the job, and completes the processing. Here, for example, the CPU 201 deletes the actual data of the corresponding job.

Upon determining in step S2010 that a print completion notification is not received, the process advances to step S2013, and the CPU 201 determines whether the request is a job list request from the image forming apparatus 1. If the request is a job list request, the process advances to step S2014. Otherwise, the process advances to step S2015. In step S2014, the CPU 201 transfers information that lists up jobs in the Queued (=job received) status in the reception order, including the job in the InProgress (=print processing in progress) status at the top, to the image forming apparatus 1, and completes the processing. On the other hand, if the request is not a job list request in step S2013, the process advances to step S2015. The CPU 201 executes another processing, and completes the processing.

An example of another processing of step S2015 is sending the job generation notification to the image forming apparatus 1 again in a case in which a response from the image forming apparatus 1 to the job generation notification in step S2005 is not obtained in a predetermined time. In this case, the processing is done based on not a request from an external apparatus but an error notification from the image forming apparatus 1 or a timeout event that occurs in the image forming apparatus 1.

Figure 8A:
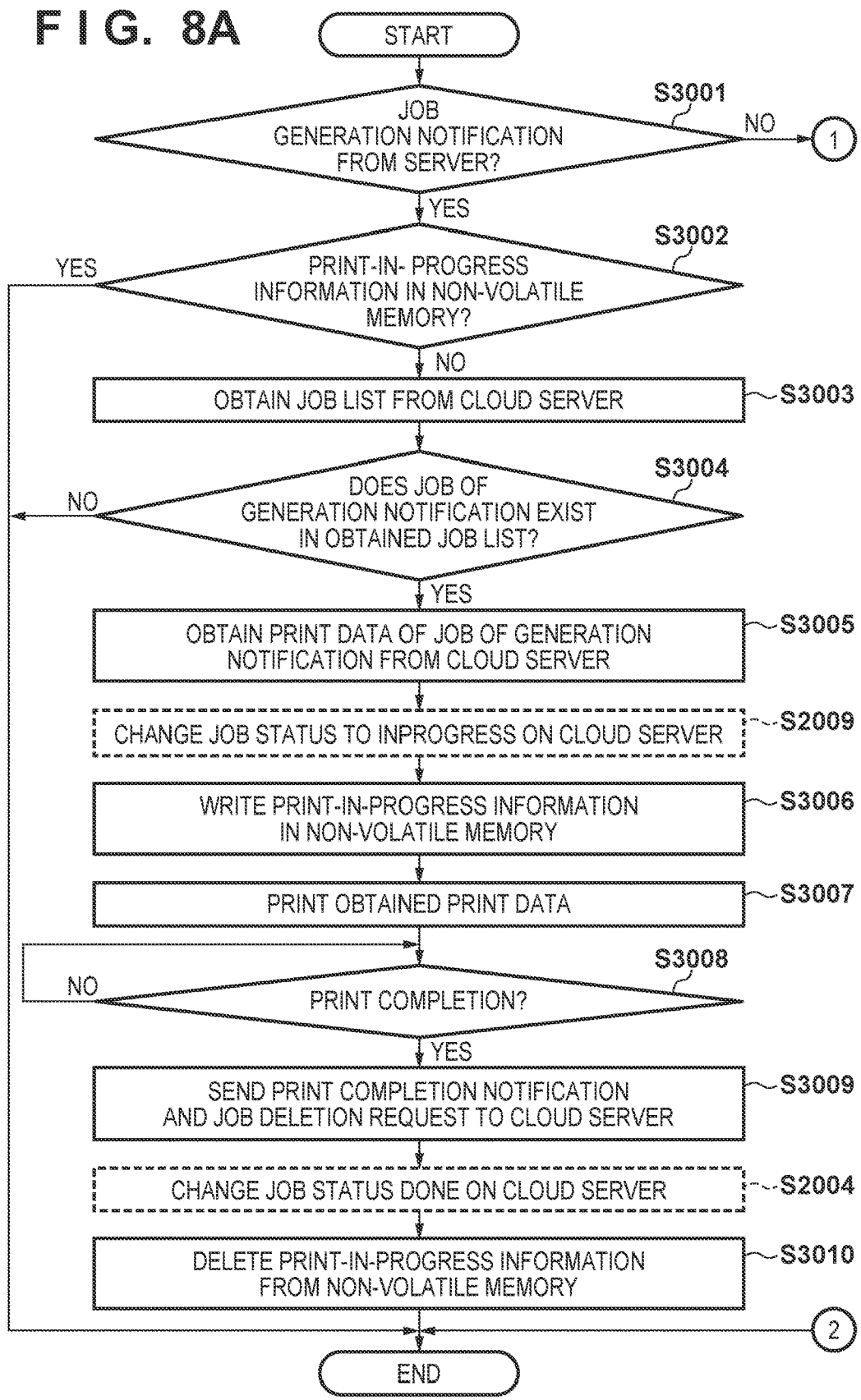
FIGS. 8A-8C are flowcharts showing the print processing procedure performed by cloud print 1003 according to the embodiment.
Figure 8B:
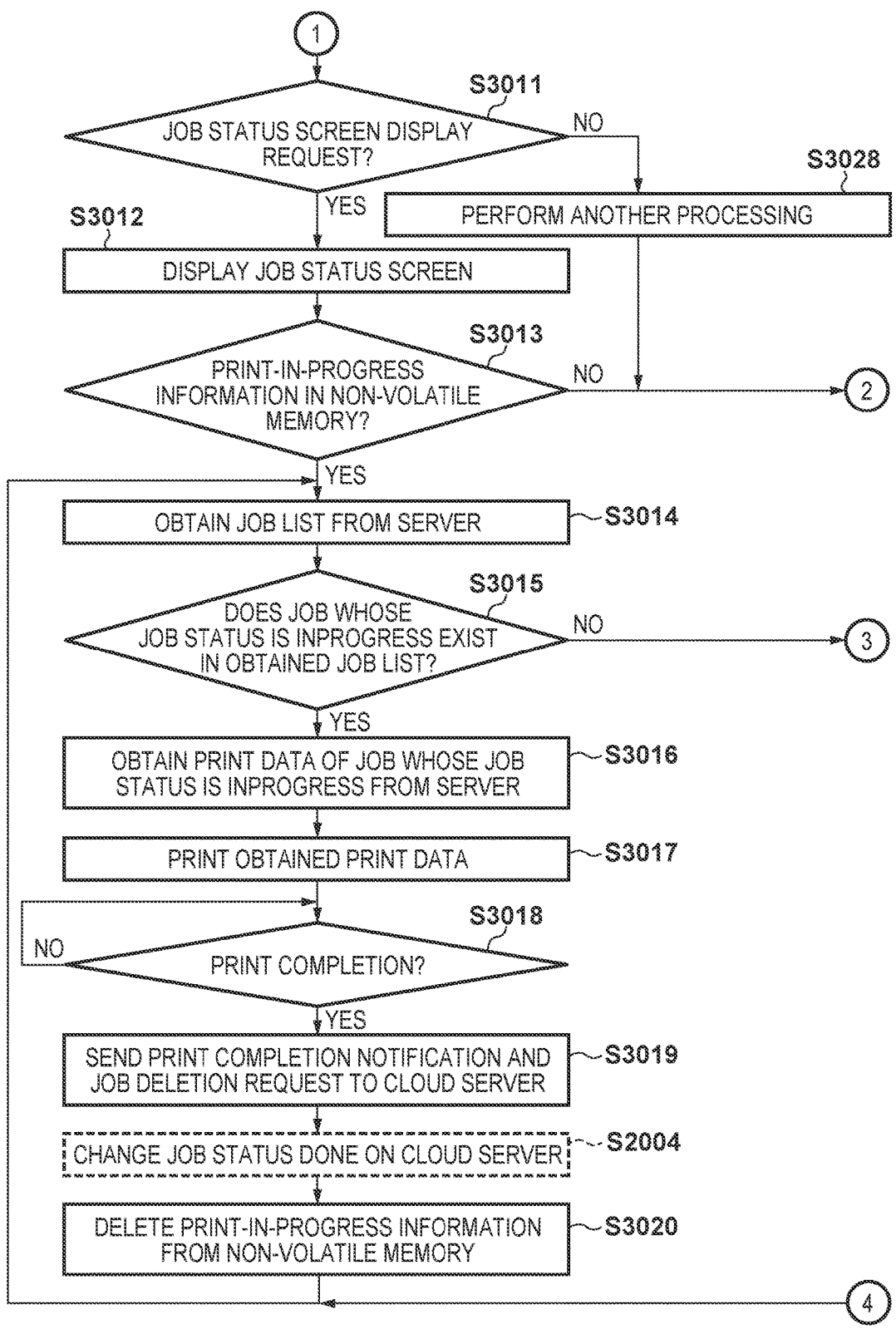
Figure 8C:
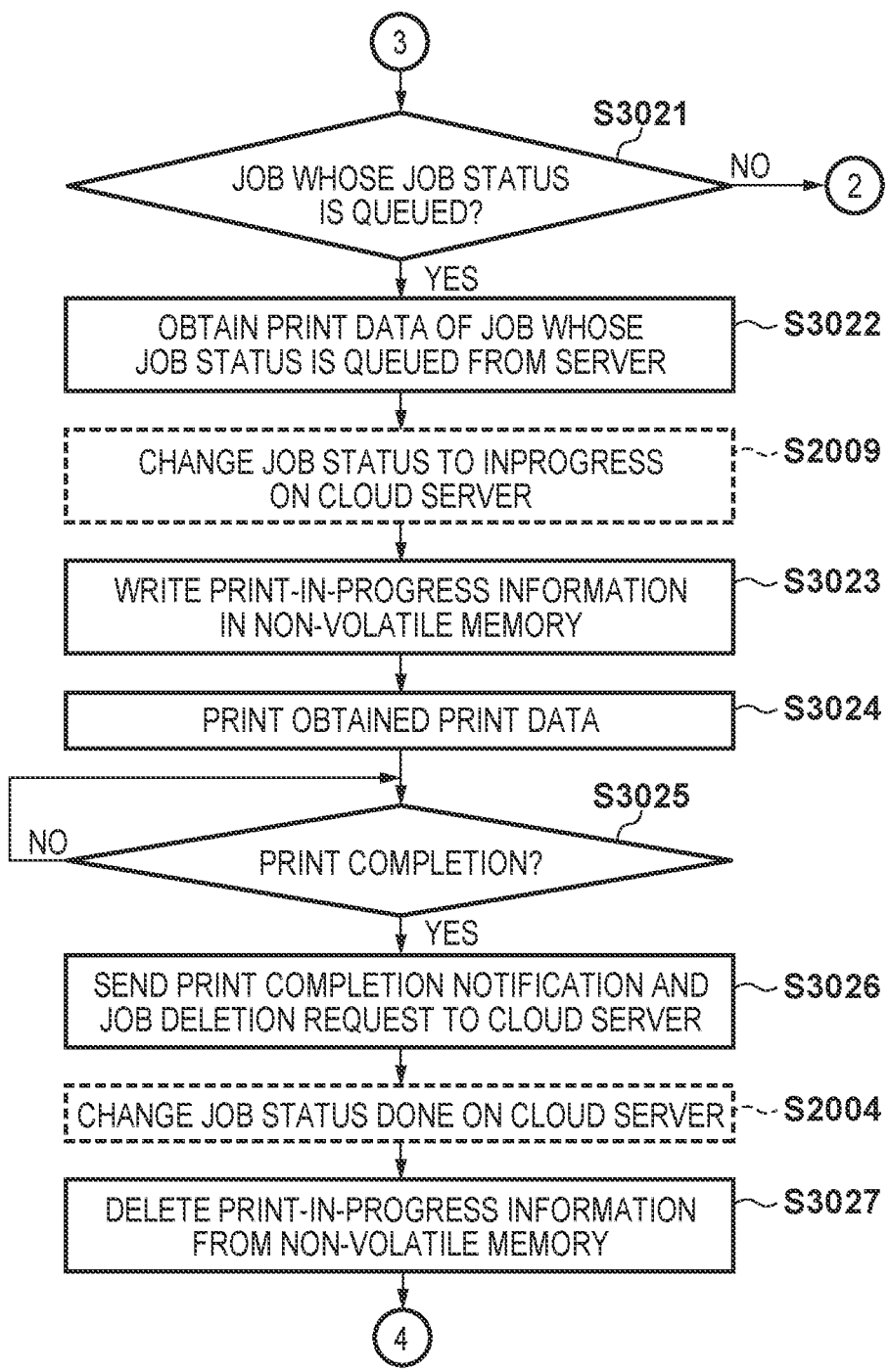

A processing procedure executed by the cloud print processing unit 1003 of the image forming apparatus 1 according to this embodiment will be described next with reference to FIGS. 8A-8C. The processing to be described below is processing implemented by executing a program that constitutes the cloud print processing unit 1003 by the CPU 101. Note that a processing box indicated by a dotted line in FIGS. 8A-8C represents processing performed by the cloud server 2.

First, in step S3001, the CPU 101 determines whether job generation is notified from the cloud server 2 to the image forming apparatus 1. If job generation is notified, the process advances to step S3002. Otherwise, the process advances to step S3011. In step S3002, the CPU 101 determines whether there exists print-in-progress information stored in the ROM 103 that is non-volatile memory. If print-in-progress information does not exist, the process advances to step S3003. On the other hand, if print-in-progress information exists, the CPU 101 completes the processing without performing any processing for the job generation notification notified in step S3001. That is, here, the CPU 101 performs neither response return to the job generation notification nor job list obtaining. Note that although the CPU 101 does not execute processing for the job generation notification (does not obtain a job list) here, it may send an error notification to the cloud server 2. In addition, the CPU 101 preferably controls execution (print) of a job whose print-in-progress information is already stored in the ROM 103 so as to re-execute the job if it is not being executed currently. In this case, if the data (print data) of the job is not held, the image forming apparatus 1 obtains the data from the cloud server 2 again and executes print.

On the other hand, in step S3003, the CPU 101 requests, from the cloud server 2, the list of jobs to be printed by the image forming apparatus 1. Next, in step S3004, the CPU 101 determines whether the job notified in step S3001 exists in the job list obtained in step S3003. If the job notified in step S3001 exists in the job list obtained in step S3003, the process advances to step S3005. On the other hand, if the job notified in step S3001 does not exist in the job list obtained in step S3003, the CPU 101 determines that the user has deleted the job upon realizing an error after the job upload to the cloud server, and completes the processing without performing any processing.

In step S3005, the CPU 101 obtains the job notification, that is, print data and the like of the job notified in step S3001 from the cloud server 2. If the job notification obtaining from the cloud server 2 is completed, the job status is changed to InProgress (=print processing in progress) in step S2009 of the cloud server 2 described above.

Next, in step S3006, the CPU 101 writes the print-in-progress information in the ROM 103 that is a non-volatile memory. The print-in-progress information will be described later with reference to FIG. 9. Next, in step S3007, the CPU 101 converts the print data obtained in step S3005 into drawn data that is bitmap data, and transfers it to the printer 108 via the printer I/F 104. In addition, the CPU 101 controls feed/discharge of a paper sheet needed to print the drawn data on actual paper and executes print processing.

In step S3008, the CPU 101 determines whether print of the print data obtained in step S3005 is completed. If print of the print data is completed, the process advances to step S3009. Otherwise, the determination of step S3008 is periodically repeated. In step S3009, the CPU 101 sends a print completion notification and a print data deletion request to the cloud server 2. Upon receiving the print completion notification from the image forming apparatus 1, the cloud server 2 changes the job status to Done (=printed) in step S2004 of the cloud server 2 described above. Next, in step S3010, the CPU 101 deletes the print-in-progress information written in step S3006 from the ROM 103 that is a non-volatile memory, and completes the processing.

On the other hand, upon determining in step S3001 that job generation is not notified, the process advances to step S3011, and the CPU 101 determines whether job status screen display is instructed via the operation unit I/F 106 by a user operation input via the operation unit 110 of the image forming apparatus 1. If job status screen display is instructed, the process advances to step S3012. Otherwise, the process advances to step S3028.

In step S3012, the CPU 101 displays the list of jobs which are processed by the image forming apparatus 1 or whose status is processing in progress or queued on the operation unit 110 via the operation unit I/F 106. The job status screen will be described later in detail with reference to FIG. 12. Next, in step S3013, the CPU 101 determines whether print-in-progress information exists in the ROM 103 that is a non-volatile memory. If print-in-progress information exists, the process advances to step S3014. Otherwise, the CPU 101 completes the processing without performing subsequent processing.

In step S3014, the CPU 101 requests, from the cloud server 2, the list of jobs to be printed by the image forming apparatus 1. Next, in step S3015, the CPU 101 determines whether a job whose status is InProgress (=print processing in progress) exists in the job list obtained in step S3014. If a job whose status is InProgress (=print processing in progress) exists, the process advances to step S3016. On the other hand, in step S3015, if a job whose status is InProgress (=print processing in progress) does not exist in the job list obtained in step S3014, the process advances to step S3021.

In step S3016, the CPU 101 obtains, from the cloud server 2, the job information of the job whose status is InProgress (=print processing in progress) and which exists in the job list obtained in step S3014. Normally, when the image forming apparatus completes obtaining of the job information, the cloud server 2 changes the job status to InProgress (=print processing in progress). However, since the status before the change is already InProgress (=print processing in progress), the cloud server 2 does not perform any processing. Additionally, in a normal case, the image forming apparatus 1 writes print-in-progress information in the ROM 103 that is a non-volatile memory. However, since print-in-progress information already exists, the image forming apparatus 1 does not perform any processing.

Next, in step S3017, the CPU 101 converts the print data obtained in step S3016 into drawn data that is bitmap data, and transfers it to the printer 108 via the printer I/F 104. In addition, the CPU 101 controls feed/discharge of a paper sheet needed to print the drawn data on actual paper and executes print processing. After that, in step S3018, the CPU 101 determines whether print of the print data obtained in step S3017 is completed. If print of the print data is completed, the process advances to step S3019. Otherwise, the determination of step S3018 is periodically repeated.

In step S3019, the CPU 101 sends a print completion notification and a print data deletion request to the cloud server 2. Upon receiving the print completion notification from the image forming apparatus 1, the cloud server 2 changes the job status to Done (=printed) in step S2004 of the cloud server 2 described above. Next, in step S3020, the CPU 101 deletes the print-in-progress information in the ROM 103 that is a non-volatile memory, and returns the process to step S3014.

On the other hand, in step S3021, the CPU 101 determines whether a job whose status is Queued (=job received) exists in the job list obtained in step S3014. If a job whose status is Queued (=job received) exists, the process advances to step S3022. Otherwise, the processing is completed.

In step S3022, the CPU 101 obtains, from the cloud server 2, the job information of the job whose status is Queued (=job received) and which exists in the job list obtained in step S3014. When obtaining of the job information from the cloud server 2 is completed, the job status is changed to InProgress (=print processing in progress) in step S2009 of the cloud server 2 described above.

In step S3023, the CPU 101 writes print-in-progress information in the ROM 103 that is a non-volatile memory. In step S3024, the CPU 101 converts the print data obtained in step S3022 into drawn data that is bitmap data, and transfers it to the printer 108 via the printer I/F 104. In addition, the CPU 101 controls feed/discharge of a paper sheet needed to print the drawn data on actual paper and executes print processing.

Next, in step S3025, the CPU 101 determines whether print of the print data obtained in step S3022 is completed. If print of the print data is completed, the process advances to step S3026. Otherwise, the determination of step S3025 is periodically repeated. In step S3026, the CPU 101 sends a print completion notification and a print data deletion request to the cloud server 2. Upon receiving the print completion notification from the image forming apparatus 1, the cloud server 2 changes the job status to Done (=printed)

in step S2004 of the cloud server 2 described above. In step S3027, the CPU 101 deletes the print-in-progress information in the ROM 103 that is a non-volatile memory, and returns the process to step S3014.

<Interruption of Communication>

Figure 11:
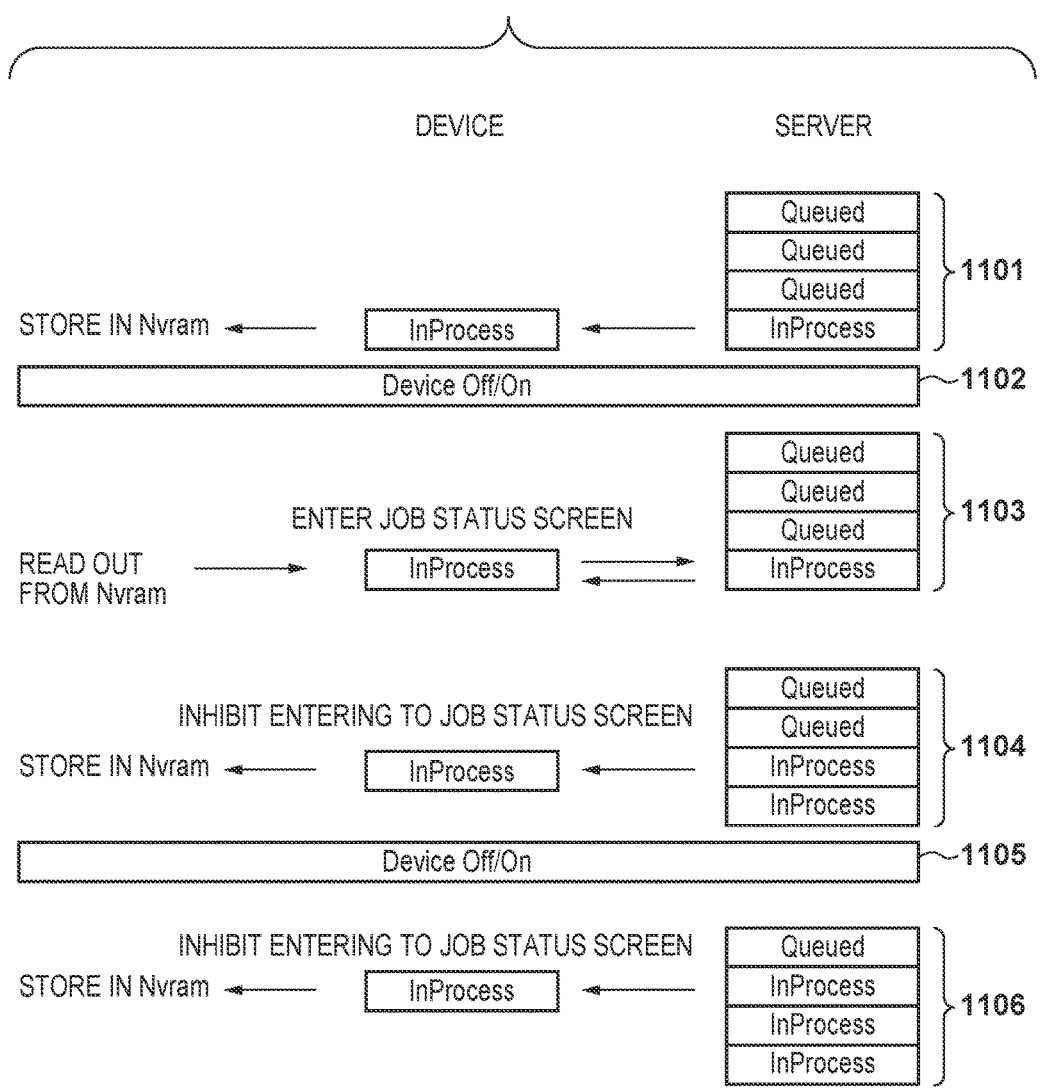
FIG. 11 is a view for explaining the cause of stay of a plurality of jobs in the "processing in progress" status.

A problem that arises at the time of the interruption of the communication between the image forming apparatus 1 and the cloud server 2 which occurs in a case in which the image forming apparatus 1 is reactivated during the process of step S1009 described above or in a case in which a network cable is disconnected will be described next with reference to FIG. 11. As indicated by 1101, during a normal operation, the status information of a job received by the cloud server 2 is set to Queued (=job received) and accumulated in the cloud server 2 in the reception order. After that, a job notification is sent to the image forming apparatus 1 in step S1003. When job information is downloaded to the image forming apparatus 1 in step S1007, status information is changed to InProgress (=print processing in progress) in step S1008.

After that, the image forming apparatus 1 is sometimes reactivated during the process of step S1009, as indicated by 1102. In this case, when advancing to job status screen display processing in step S3012, as indicated by 1103, the image forming apparatus 1 refers to print-in-progress information held in the ROM 103 and, if print-in-progress information exists, the processing from step S3014 is executed. In this case, there is no risk that a plurality of jobs in the "print processing in progress" status exist.

However, after the reactivation of the image forming apparatus 1 (interruption of communication), the cloud server 2 may receive a new job from an external apparatus or the like without transition to job status screen display processing, as indicated by 1104. In this case, if a job notification is sent to the image forming apparatus 1, the image forming apparatus 1 newly receives the job, and a plurality of jobs in the "print processing in progress" status are generated unless the control shown in FIGS. 8A-8C is executed. In addition, if the image forming apparatus 1 is reactivated in 1105, the number of jobs in the "print processing in progress" status may increase, as indicated by 1106. In this case, the job print order cannot be guaranteed. Hence, in the image forming system according to this embodiment, as described above, if print-in-progress information is held in the non-volatile memory, control is performed to inhibit reception of a new job, thereby solving the above-described problem.

<Print-In-Progress Information>

An example of print-in-progress information (including a job generation notification) processed in step S1003 of FIG. 6, step S2005 of FIG. 7, and steps S3001, S3006, and S3023 of FIGS. 8A-8C will be described next with reference to FIG. 9. In this embodiment, the print-in-progress information is described by a known format such as XML (Extensible Markup Language) or JSON (JavaScript® Object Notation: RFC4627).

As shown in FIG. 9, the job generation notification and print-in-progress information includes at least one piece of information of the identifier of the job, a job type, a job size, a job name, and the obtaining destination of a file used in the job. If the print-in-progress information is stored in a memory such as the ROM 103, the CPU 101 recognizes that a corresponding job is being printed by the image forming apparatus 1. Hence, information that allows the CPU to identify a corresponding job suffices. That is, if information representing a job is stored in a memory such as the ROM 103, the information serves as print-in-progress information and represents that the job is in the "print processing in progress" status.

<Job List>

An example of a job list that is information exchanged in step S1005 of FIG. 6, step S2014 of FIG. 7, and steps S3003 and S3014 of FIGS. 8A and 8B will be described next with reference to FIG. 10. The data format is the same as in FIG. 9, and a description thereof will be omitted.

As shown in FIG. 10, the job list includes job identification information (the identification information of a specific job) for each job. The job identification information includes status information representing a job status, in addition to the information (print-in-progress information) used to identify a job described with reference to FIG. 9.

Note that in the job list shown in FIG. 10, if the image forming apparatus 1 receives the job generation notification of "job_id:001", "job_status: Queued" that is status information changes to "job_status: InProgress". In this status, the image forming apparatus 1 is powered off and powered on again. After that, the job generation notification of "job_id:002" is sent. When the image forming apparatus 1 receives it, "job_status: Queued" changes to "job_status: InProgress". Here, the image forming apparatus 1 is powered off again in this status. If the image forming apparatus 1 is reactivated in this case, a plurality of jobs in the InProgress status are generated, and the print order cannot be guaranteed. Hence, the image forming system performs the above-described control, thereby providing a mechanism for guaranteeing the print order.

<Job Status Screen>

Figure 12:
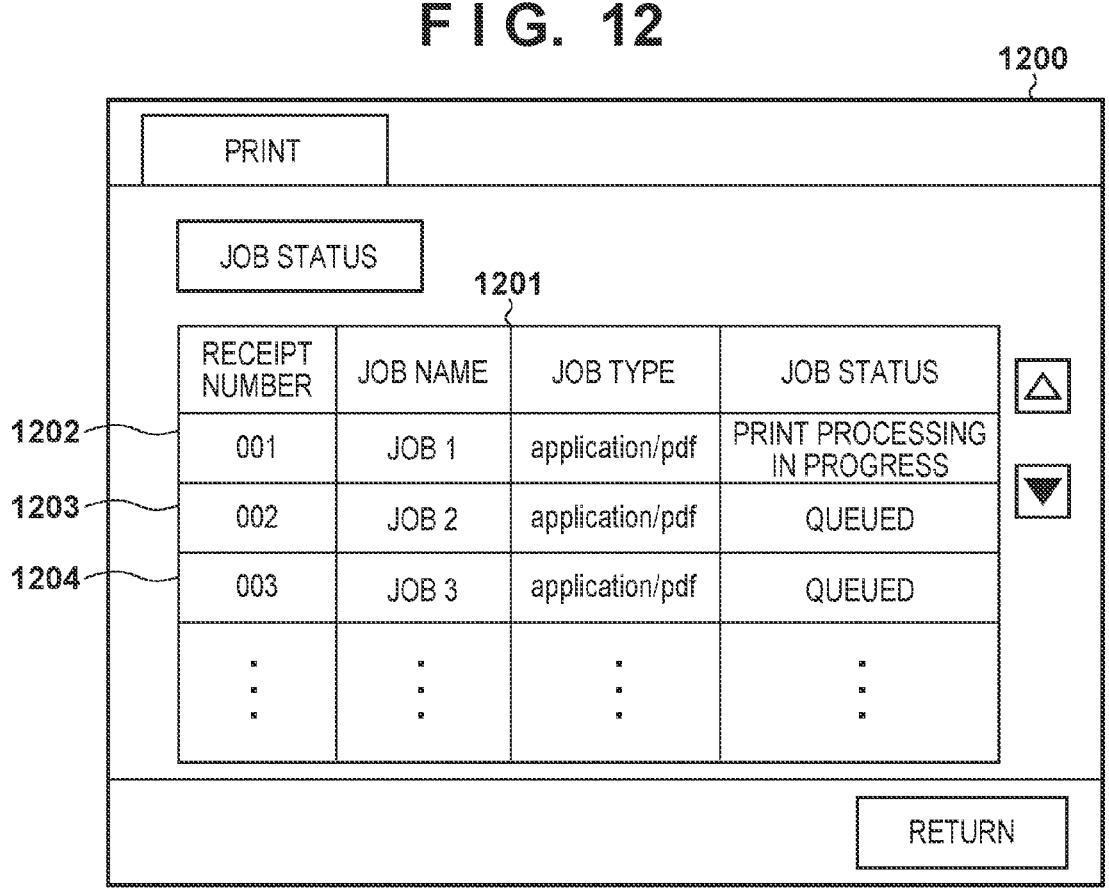
FIG. 12 is a view showing a job status screen displayed on the image forming apparatus 1 according to the embodiment.

A job status screen 1200 displayed on the operation unit 110 of the image forming apparatus 1 will be described next with reference to FIG. 12. The job status screen 1200 displays the information of a job status 1201 of each job received by the image forming apparatus 1. For example, as shown in FIG. 12, the receipt number, the job name, the job type, and the job status of each of a job 1202 in the "print processing in progress" status and jobs 1203 and 1204 in the queued status are displayed. Note that the display information is merely an example and does not intend to limit the present invention. It is only necessary to identifiably display the execution status of each job received by the image forming apparatus 1.

As described above, if the completion operation for a job cannot be performed, and the job under processing exists due to power-off of the image forming apparatus or disconnection of the network to the cloud server halfway through print, the image forming apparatus is inhibited from receiving a new job. This makes it possible to perform print processing of the job under processing with top priority and process and print jobs in an order intended by the user. More specifically, since the presence/absence of a job in the InProgress (=print processing in progress) status can be confirmed based on print-in-progress information in the non-volatile memory, reception of a new job can be stopped without inquiring of the cloud server about a job in the InProgress (=print processing in progress) status. In addition, a plurality of jobs are prevented from changing to InProgress (=print processing in progress), thereby guaranteeing the print order of the jobs.

<Modification>

The present invention is not limited to the above-described embodiment, and various modifications can be made. For example, in the above-described embodiment, only a job obtained from the cloud server 2 is assumed to be a new job. However, the image forming apparatus 1 can also receive a job input (to be referred to as a normal job) from an external apparatus other than the cloud server 2, for example, a PC to the image forming apparatus 1 via, for example, the wired LAN 6. When the normal job is received, the job is preferably received independently of the presence/absence of identification information.

Figure 13:
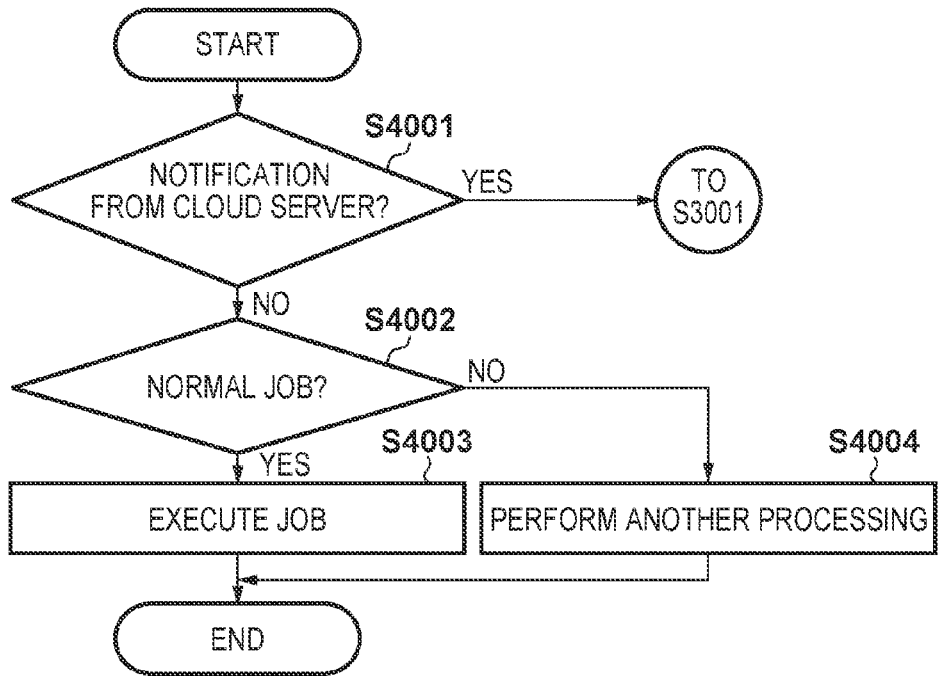
FIG. 13 is a flowchart showing a processing procedure of determining a notification received by the image forming apparatus 1 according to the embodiment.

Detailed processing will be described with reference to FIG. 13. FIG. 13 is a flowchart showing determination processing performed when a job is received. The CPU 101 loads a control program stored in the ROM 103 to the RAM 102 and executes it, thereby implementing processing to be described below. Note that the processing is preferably executed before step S3001 of FIG. 8A.

Upon receiving a notification from an external apparatus, the CPU 101 determines in step S4001 whether it is a notification from the cloud server 2. If the notification is a notification from the cloud server 2, the process advances to step S3001 of FIG. 8A. Otherwise, the process advances to step S4002.

In step S4002, the CPU 101 determines whether the notification from the external apparatus is a job execution request, for example, a print execution request. If the notification is a job execution request, the process advances to step S4003. The CPU 101 executes, for example, print processing and completes the processing. On the other hand, if the notification is not a job execution request, the process advances to step S4004. The CPU 101 executes another processing and completes the processing.

In the determination of step S4001, whether the notification is a normal job is determined by determining whether the device that has issued the notification is a specific device (cloud server 2). That is, if the notification is a notification from the cloud server 2, it can be a cloud print request. Hence, the CPU 101 determines that the notification is not a normal job, and advances to the process of step S3001. On the other hand, if the notification is a notification from a device other than the cloud server 2, it can be a normal job. Hence, print processing is executed independently of the presence/absence of print-in-progress information in the non-volatile memory.

Instead of the determination of step S4001, the CPU 101 may determine whether the communication method of the received notification is the PULL method used in cloud print or the PUSH method used in normal print. Alternatively, the determination may be done based on the type of print data or information included in the header of the print data. Note that a job input via the operation unit 110 of the image forming apparatus 1 is also preferably handled as the normal job.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-131038 filed on Jun. 30, 2016, which is hereby incorporated by reference herein in its entirety.

What is claimed is:

1. An image forming apparatus capable of communicating with an external apparatus, comprising:
   a storage configured to store information;
   an image forming unit configured to form an image on a sheet; and
   one or more controllers having a processor executing instructions stored in a memory or having circuitry, configured to perform:
   processing of obtaining first print data from the external apparatus and storing, in the storage, identification information representing that image formation based on the first print data is uncompleted; and
   processing of obtaining second print data from the external apparatus in a status in which the identification information is not stored in the storage, and not obtaining of the second print data from the external apparatus in a status in which the identification information is stored in the storage.

2. The apparatus according to claim 1, wherein the controllers are further configured to perform:
   processing of causing the image forming unit to execute image formation based on the first print data and deleting the identification information from the storage.

3. The apparatus according to claim 1, wherein the controllers are further configured to perform:
   processing of obtaining the print data from the external apparatus based on the identification information.

4. The apparatus according to claim 1, wherein the controllers are further configured to perform:
   processing of receiving, from the external apparatus, a notification representing that obtainable print data exists and obtaining the first print data from the external apparatus; and
   processing of receiving, from the external apparatus, the notification representing that the obtainable print data exists, obtaining the second print data from the external apparatus in the status in which the identification information is not stored in the storage, and not obtaining of the second print data from the external apparatus in a status in which the identification information is stored in the storage.

5. The apparatus according to claim 1, wherein the controllers are further configured to perform:

processing of notifying the external apparatus of completion of a job when the image formation by the image forming unit is completed.

6. The apparatus according to claim 1, wherein the controllers are further configured to perform:
processing of, upon receiving display of a screen to confirm a job status in the image forming apparatus by a user operation, displaying the screen, obtaining a job list of the image forming apparatus managed by the external apparatus, and if a job whose status information represents that processing is in progress exists in the job list, obtaining data about the job from the external apparatus and causing the image forming unit to execute image formation based on the obtained data.

7. The apparatus according to claim 6, wherein the controllers are further configured to perform:
processing of, when the job list is obtained, if the job whose status information represents that processing is in progress does not exist in the job list, and a job whose status information represents that the job is received exists, obtaining data about the job from the external apparatus, causing the image forming unit to execute image formation based on the obtained data, and storing identification information representing the job in the storage.

8. The apparatus according to claim 6, wherein the controllers are further configured to perform:
processing of, upon receiving display of the screen to confirm the job status in the image forming apparatus by the user operation, if identification information of a predetermined job is stored in the storage, obtaining the job list from the external apparatus.

9. The apparatus according to claim 1, wherein the storage comprises a non-volatile memory.

10. A control method of an image forming apparatus capable of communicating with an external apparatus, the image forming apparatus comprising: a storage configured to store information; an image forming unit configured to form an image on a sheet; and one or more controllers having a processor executing the control method comprising:
obtaining first print data from the external apparatus and storing, in the storage, identification information representing that image formation based on the first print data is uncompleted;
obtaining second print data from the external apparatus in a status in which the identification information is not stored in the storage; and
not obtaining of the second print data from the external apparatus in a status in which the identification information is stored in the storage.

11. A non-transitory computer-readable storage medium storing a control program configured to cause a computer to execute a control method of an image forming apparatus capable of communicating with an external apparatus, the image forming apparatus comprising: a storage configured to store information; an image forming unit configured to form an image on a sheet; and one or more controllers having a processor executing the control method comprising:
obtaining first print data from the external apparatus and storing, in the storage, identification information representing that image formation based on the first print data is uncompleted;
obtaining second print data from the external apparatus in a status in which the identification information is not stored in the storage; and
not obtaining of the second print data from the external apparatus in a status in which the identification information is stored in the storage.

12. An image forming system comprising a server configured to manage print data, and an image forming apparatus configured to perform image formation based on print data,
wherein the server is configured to perform:
processing of notifying the image forming apparatus that transmissible print data exists; and
processing of transmitting requested print data in accordance with a request from the image forming apparatus, and
the image forming apparatus is configured to perform:
processing of obtaining first print data from an external apparatus and storing identification information representing that image formation is uncompleted; and
processing of receiving the notification and requesting transmission of second print data in a status in which the identification information is not stored, and receiving the notification and not requesting of transmission of the second print data from the server in a status in which the identification information is stored.

* * * * *